United States Patent [19]
Cohen

[11] Patent Number: 5,829,686
[45] Date of Patent: Nov. 3, 1998

[54] IRRIGATION EMITTERS HAVING REDUCED SENSITIVITY TO CLOGGING

[76] Inventor: Amir Cohen, Yuvalim, 20 142 Doar Na Gush Segev, Israel

[21] Appl. No.: 850,104

[22] Filed: May 1, 1997

[30] Foreign Application Priority Data

May 22, 1996 [IL] Israel ......................................... 118377

[51] Int. Cl.$^6$ ........................................................ B05B 1/02
[52] U.S. Cl. ........................ 239/533.1; 239/542; 239/547
[58] Field of Search ...................................... 239/107, 104, 239/106, 533.1, 533.13, 542, 547, 566, 567

[56] References Cited

U.S. PATENT DOCUMENTS

| | | |
|---|---|---|
| 3,998,427 | 12/1976 | Bentley . |
| 4,177,946 | 12/1979 | Sahagun-Barragan . |
| 4,366,926 | 1/1983 | Mehoudar . |
| 4,502,631 | 3/1985 | Christen . |
| 4,687,143 | 8/1987 | Gorney . |
| 4,817,875 | 4/1989 | Karmeli . |
| 5,111,996 | 5/1992 | Eckstein . |
| 5,236,130 | 8/1993 | Hadar . |
| 5,400,973 | 3/1995 | Cohen . |

*Primary Examiner*—Andres Kashnikow
*Assistant Examiner*—Lisa Ann Douglas
*Attorney, Agent, or Firm*—Benjamin J. Barish

[57] ABSTRACT

A drip irrigation emitter defining a flow control passageway having an inlet to communicate with a supply of pressurized water, and an outlet to communicate with a water discharge opening, includes an obstruction formation between the flow control passageway outlet and the water discharge opening effective to produce a relatively small obstruction to the flow in the direction from the flow control passageway outlet to the water discharge opening, and a relatively large obstruction to the flow in the reverse direction such as to reduce the possibility of the entry of external solid particles into the emitter via the water discharge opening.

20 Claims, 7 Drawing Sheets

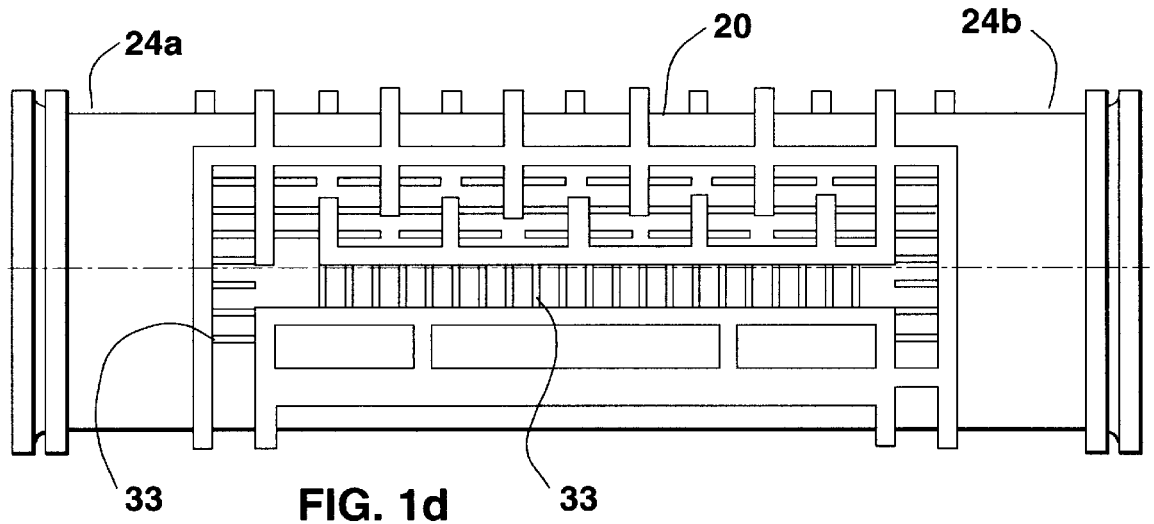
FIG. 1d
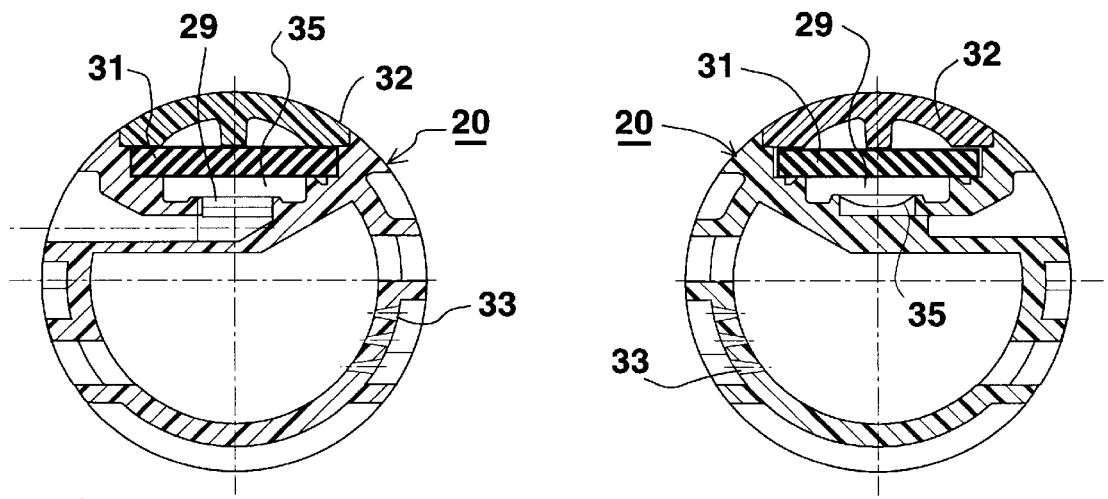
FIG. 1e
FIG. 1f
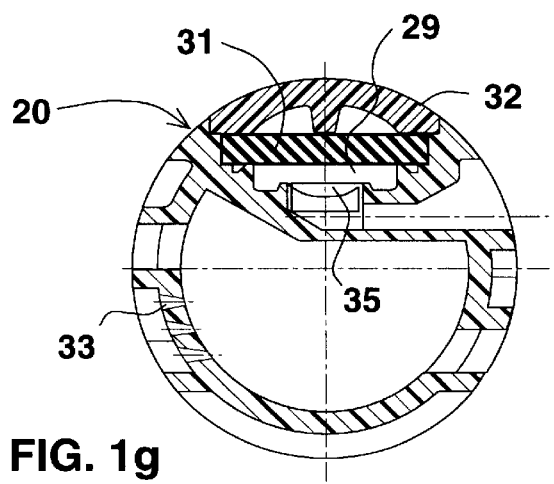
FIG. 1g

FIG.4
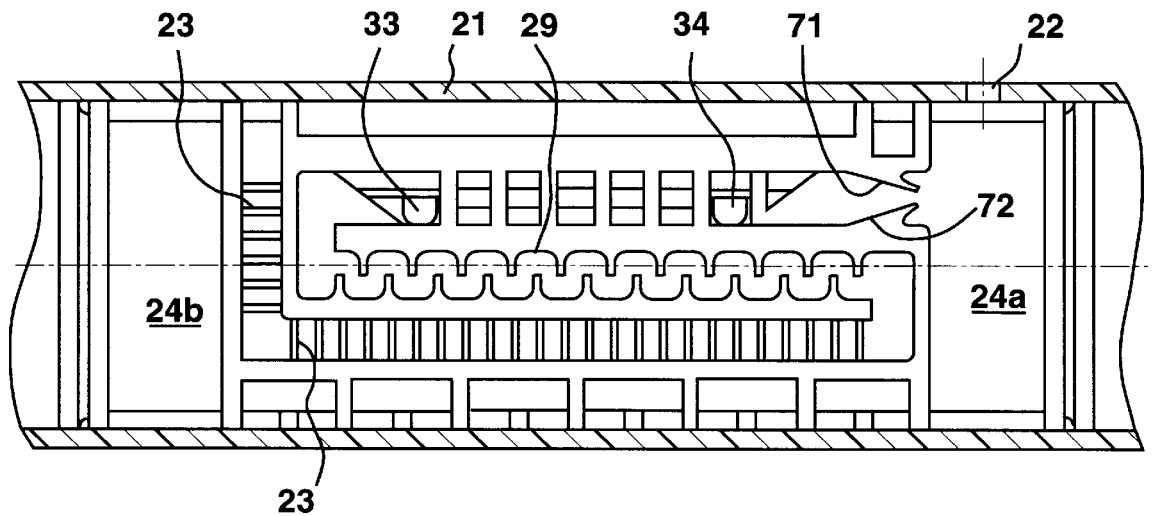
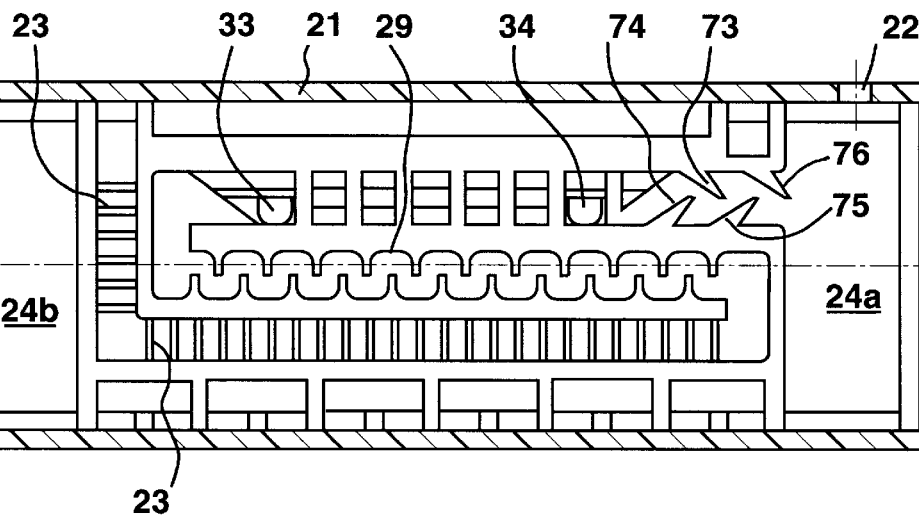
FIG.5

5,829,686

IRRIGATION EMITTERS HAVING REDUCED SENSITIVITY TO CLOGGING

FIELD AND BACKGROUND OF THE INVENTION

The present invention relates to irrigation emitters, and particularly to emitters having reduced sensitivity to clogging.

Irrigation emitters are commonly constructed with relatively large passageways to reduce the sensitivity of the emitter to clogging by particles in the irrigation water. However, such emitters may also be clogged by external particles, such as dirt entering the emitters via the water discharge openings. The problem is particularly acute when a water irrigation tube is emptied, since this produces a vacuum within the tube which tends to suck external particles into the emitter units via the water discharge openings in the tube. For this reason, special pains are frequently taken in installing a water irrigation tube to expose the water discharge openings to the air and not to the soil, but even then external solid particles may enter the tube via the water discharge openings particularly when the tube is emptied.

OBJECTS AND BRIEF SUMMARY OF THE INVENTION

An object of the present invention is to provide a drip irrigation emitter having a reduced sensitivity to clogging by the entry of external particles via the water discharge openings.

According to a broad aspect of the present invention, there is provided a drip irrigation emitter defining a flow control passageway having an inlet to communicate with a supply of pressurized water, and an outlet to communicate with a water discharge opening; characterized in that the emitter further includes an obstruction formation between the outlet of the flow control passageway and the water discharge opening effective to produce a relatively small obstruction to the flow in the direction from the outlet of the flow control passageway to the water discharge opening, and a relatively large obstruction to the flow in the reverse direction such as to reduce the possibility of the entry of external solid particles into the emitter via the water discharge opening.

According to a more specific aspect of the present invention, there is provided a drip irrigation emitter comprising a water supply tube for conducting water therethrough and having a plurality of water discharge openings spaced along its length; and a plurality of emitter units secured within the water supply tube such that each emitter unit defines with the tube a flow control passageway having an inlet communicating with the interior of the water supply tube and an outlet communicating with a water discharge opening in the water supply tube; each of the emitter units including an obstruction formation between the outlet of the flow control passageway and the water discharge opening effective to produce a relatively small obstruction to the flow in the direction from the outlet of the flow control passageway to the water discharge opening, and a relatively large obstruction to the flow in the reverse direction such as to reduce the possibility of the entry of external solid particles into the emitter via the water discharge opening.

Several embodiments of the invention are described below for purposes of example. In some described embodiments, the obstruction formation includes a tooth formed with one face facing the outlet of the flow control passageway and having a relatively small angle to the emitter surface at the outlet such as to produce a relatively small obstruction to the flow in the direction from the outlet to the water discharge opening, and an opposite face facing the water discharge opening and having a relatively large angle to the emitter surface such as to produce a relatively large obstruction to the flow in the reverse direction. In another described embodiment, the obstruction formation includes a one-way valve between the outlet of the flow control passageway and the water discharge opening, and effective to permit free flow in the first-mentioned direction, but to block flow in the reverse direction.

Further features and advantages of the invention will be apparent from the description below.

BRIEF DESCRIPTION OF THE DRAWINGS

The invention is herein described, by way of example only, with reference to the accompanying drawings, wherein:

FIGS. 1a–1g illustrate a drip irrigation emitter similar to those described in my prior U.S. Pat. Nos. 5,400,973 and 5,609,303; FIG. 1a being a longitudinal sectional view of the emitter; FIGS. 1b, 1c and 1d being plan views illustrating the emitter unit at three different 90° positions; and FIGS. 1e, 1f and 1g being sectional views along lines 1e, 1f and 1g respectively, of FIG. 1c;

FIG. 4 is a view similar to that of FIG. 2 but illustrating a further modification in accordance with the present invention;

FIG. 5 is a view similar to that of FIG. 4 but illustrating a still further modification in accordance with the present invention;

and FIG. 7b is an enlarged fragmentary view of a portion of in FIG. 7a.

DESCRIPTION OF PREFERRED EMBODIMENTS

Figure 1A:
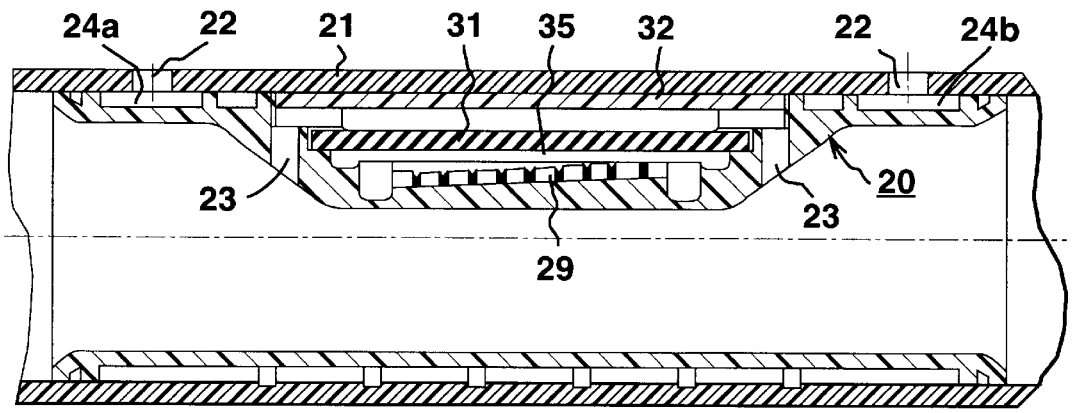
Figure 1B:
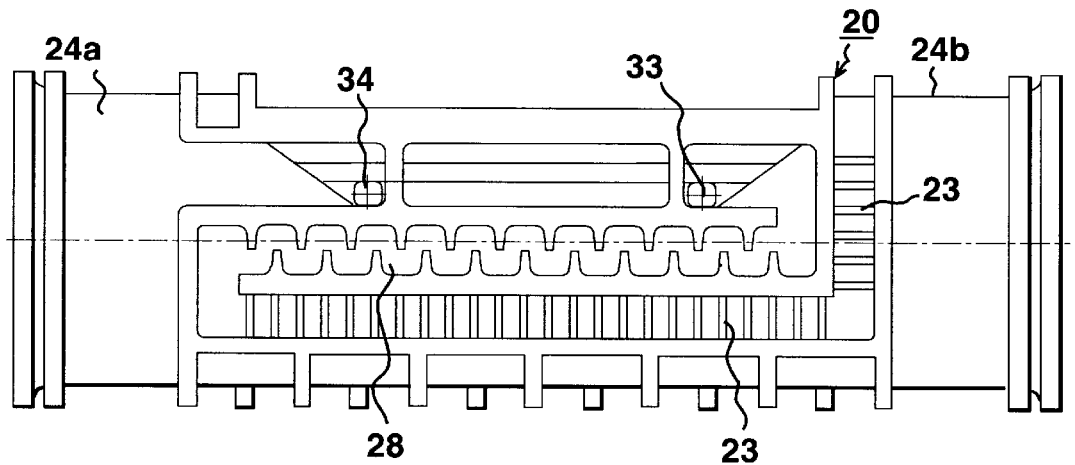
Figure 1C:
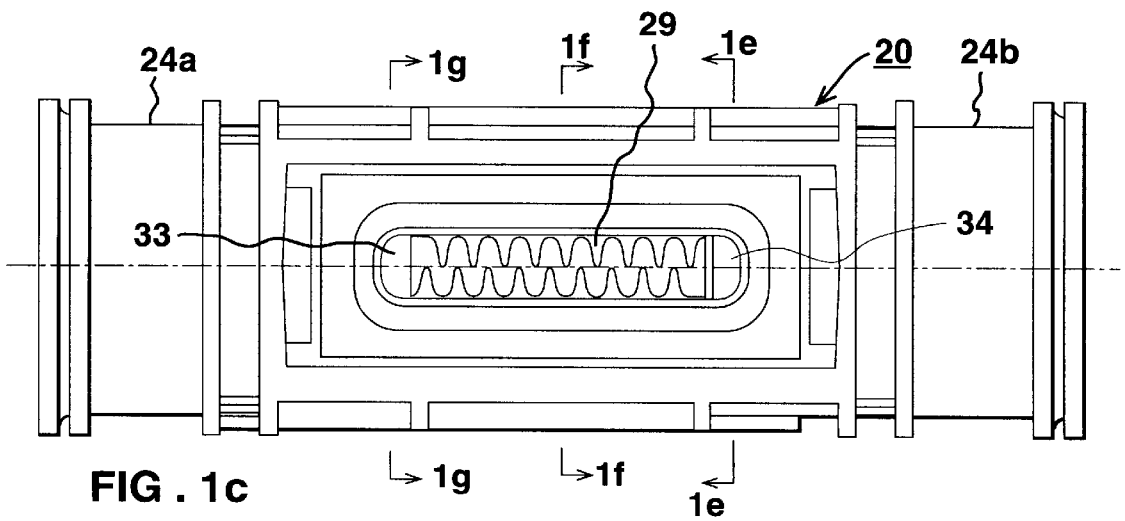

The emitter illustrated in FIGS. 1b–1g is similar to those described in my prior U.S. Pat. Nos. 5,400,973 and 5,609,303. It includes a plurality of emitter units 20 (only one of which is shown in FIG. 1a) of cylindrical configuration bonded to the inner face of the water supply tube 21 for each pair (or each one) of its water discharge openings 22. Each emitter unit 20 is formed with a plurality of narrow inlet openings 23 communicating with the interior of the water supply tube 21, and with a pair of annular channels 24a, 24b on its opposite ends communicating with the pair of water discharge openings 22.

The outer surface of the emitter unit 20 is formed with a flow control passageway for controlling the water flow from the inlets 23 to the outlet channels 24a, 24b. This flow control passageway includes a flow-reducing labyrinth defined by baffles 28 (FIG. 1b) and the inner face of tube 21 at the upstream end of the emitter unit, and a flow-regulating labyrinth defined by baffles 29 (FIGS. 1a, 1c) and an elastomeric membrane 31 at the downstream end of the emitter unit. Membrane 31 is secured to the emitter unit by an external cap 32.

Baffles 28 are all the same height so that they define, with the inner face of the water supply tube 21, a flow-reducing labyrinth which produces a fixed pressure drop in the water flowing through it.

Baffles 29, however, define with the inner face of membrane 31 a flow-regulating labyrinth which regulates the flow through it by sequentially closing clearances between the membrane and the baffles in response to the pressure within the water supply tube. Thus, baffles 29 are of decreasing height to define clearances 35 of increasing height from the inlet 33 of this labyrinth to the outlet 34. The outer face of membrane 31 is exposed to the pressure within the water supply tube via slits 23, such that the membrane, with an increase in pressure in the water supply tube, sequentially closes the clearances 35 defined by its inner face and baffles 29, to thereby regulate the flow through this labyrinth in response to pressure.

The water enters the emitter unit via the plurality of narrow openings 23, flows through the flow-reducing (non-regulating) labyrinth defined by baffles 28, and then via a throughgoing hole 33 to the flow-regulating labyrinth defined by baffles 29. The water exits from the latter labyrinth via its outlet 34, the two outlet channels 24a, 24b at the opposite ends of the emitter unit, and the water discharge openings 22 in the water supply tube 21 aligned with these outlet channels.

For further details of the construction and operation of the illustrated emitter, reference may be made to the above cited patents.

Figure 2:
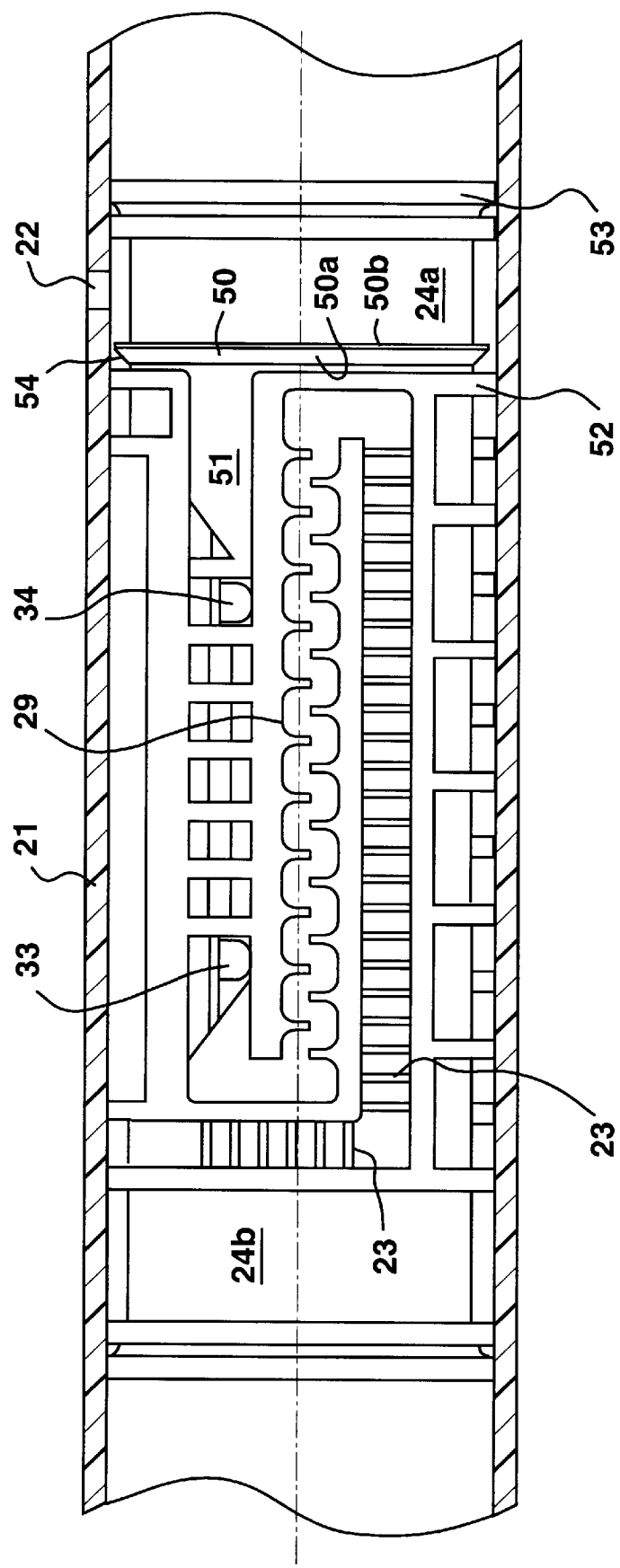
FIG. 2 is a view similar to that of FIG. 1b but illustrating one modification in the construction of the emitter to incorporate the present invention.

FIG. 2 illustrates one manner of modifying the above-described drip irrigation emitter in order to decrease its sensitivity to clogging by particles externally of the water supply tube, particularly during the emptying of the tube when suction created within the tube tends to suck in such external particles via the water discharge openings 22. The view of FIG. 2 corresponds to that of FIG. 1b, except that it is a mirror image of that view; in addition, it includes only one water discharge opening 22 in alignment with outlet channel 24a of the emitter unit.

In order to reduce the sensitivity of the emitter unit to the type of clogging mentioned above, the outer surface of the emitter unit includes an obstruction formation, therein designated 50, between the outlet 34 of the flow-regulating labyrinth 29 and the annular outlet channel 24a in alignment with the water discharge opening 22. Obstruction formation 50 is in the form of a deformable annular tooth or rib extending around the circumference of the emitter unit so that it is in the path of the water flowing via recess 51 from the labyrinth outlet 34 to the outlet channel 24a. Its height, however, is slightly less than the height of two annular ribs 52, 53 defining the outlet channel 24a, so that when the emitter unit is inserted within the water supply tube 21, it defines an annular clearance 54 between it and the inner surface of the tube.

Annular tooth 50 is formed with one face 50a facing the outlet 34 of the flow-regulating labyrinth 29, and an opposite face 50b facing the annular outlet channel 24a. Tooth face 50a has a relatively small angle to the emitter surface at the outlet 34 and its recess 51 such as to produce a relatively small obstruction to the flow of the water in the direction from outlet 34 to the outlet channel 24a and the water discharge opening aligned with it. The opposite face 50b of annular tooth 50, however, has a relatively large angle to the outer surface of the emitter so that it produces a relatively large obstruction to the flow in the reverse direction, from outlet channel 24a to the outlet opening 34 of the emitter, such as to reduce the possibility of the entry of external solid particles into the emitter via the water discharge openings 22. Preferably, tooth 50 is dimensioned so as to be deformable under pressure such as to increase the clearance 54 (and thereby decrease the obstruction) under forward flow towards the water discharge opening 22, and to decrease the clearance (and thereby increase the obstruction) under reverse flow from the water discharge opening.

During normal operation, if the clearance 54 should become blocked by a particle, the build up of pressure in the tube will cause its wall 21 to bulge outwardly, and/or tooth 50 to deform inwardly, and thereby to release the clogging particle, which will then be washed out through the discharge opening 21. On the other hand, when there is a vacuum within the tube, a clogging particle within clearance 54 will cause the tube wall 21 to deform inwardly, and/or tooth 50 to deform outwardly, to close clearance 54 and thereby to prevent the clogging particle from entering the emitter control passageway.

Figure 3:
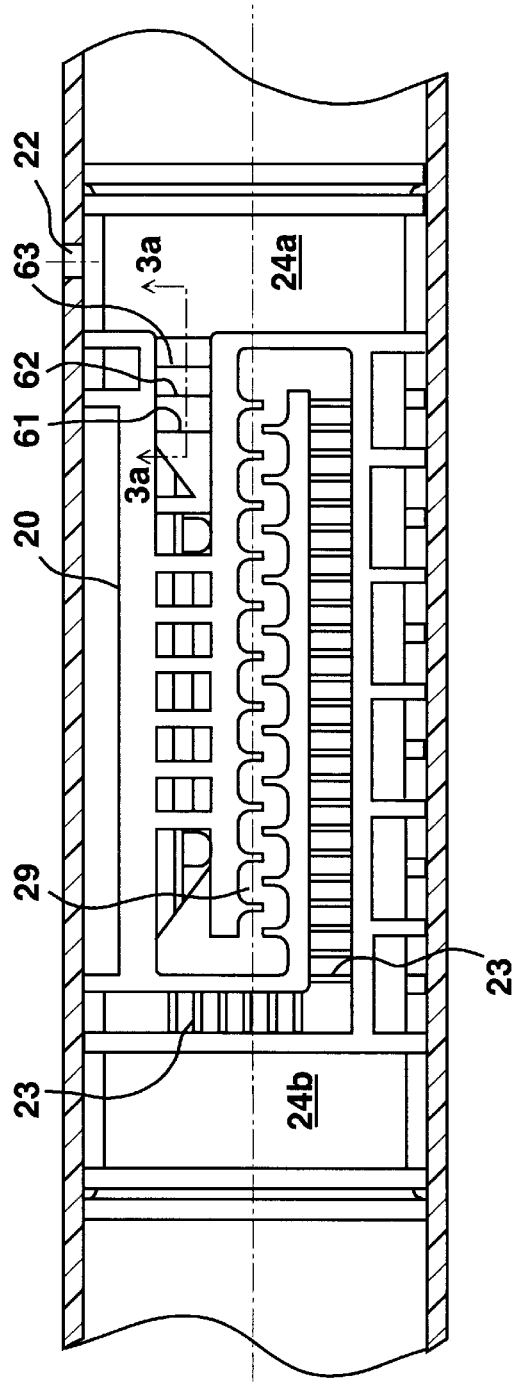
FIG. 3 is a view similar to that of FIG. 2 but illustrating another modification in the construction to incorporate the present invention.
Figure 3A:
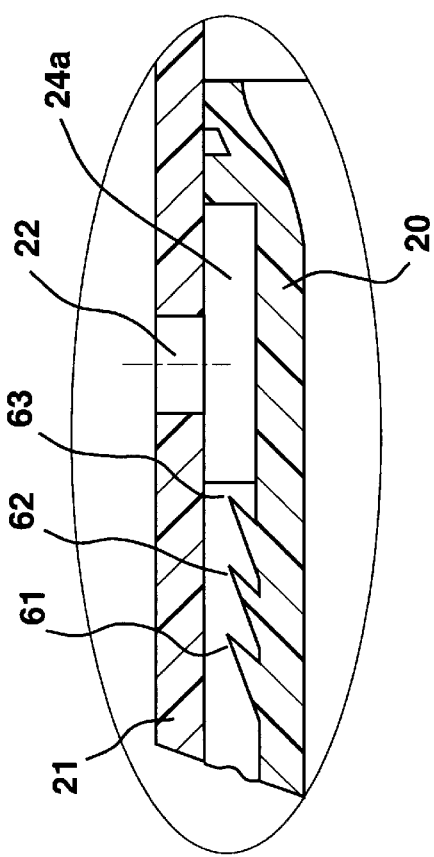
FIG. 3a is an enlarged fragmentary view of a portion of FIG. 3 along line 3a of FIG. 3.

FIGS. 3 and 3a illustrate a modification wherein a plurality of teeth 61–63 are provided between the outlet opening 34 from the flow-regulating labyrinth 29 and the outlet channel 24a aligned with the water discharge opening 22. Each of the teeth 61–63 in FIGS. 3 and 3a may be of the same construction as tooth 50 in FIG. 2. The modification of FIGS. 3 and 3a will thus operate in substantially the same manner as described above with respect to FIG. 2, except that the plurality of teeth will provide a larger capability of blocking and retaining any solid particles that may enter the supply tube via its water discharge opening 22.

FIG. 4 illustrates a further modification wherein the obstruction is in the form of a pair of opposed, deformable teeth 71, 72, between the outlet 34 of the flow-regulating labyrinth 29 and the outlet channel 24a aligned with the water discharge opening 22 in the water supply tube. The faces of the two teeth 71, 72 are slanted so as to present a small obstruction to the flow in the forward direction from outlet 34 to the outlet channel 24a, but a large obstruction to the reverse flow, thereby decreasing the possibility of entry of solid particles into the emitter via the water discharge openings.

FIG. 5 illustrates the modification in the construction of FIG. 4, wherein two (or more) pairs of opposed teeth 73, 74 and 75, 76 are provided to produce a small obstruction to the flow in the forward direction from outlet 34 to the outlet channel 24a, but a relatively large obstruction to the flow in the reverse direction.

Figure 6:
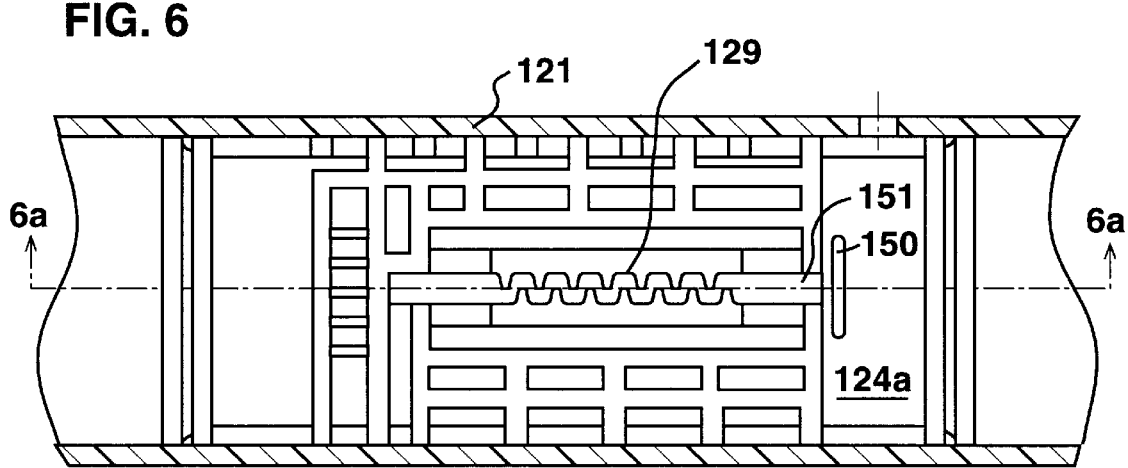
FIG. 6 illustrates another construction of emitter unit but modified in one manner to incorporate the present invention.
Figure 6A:
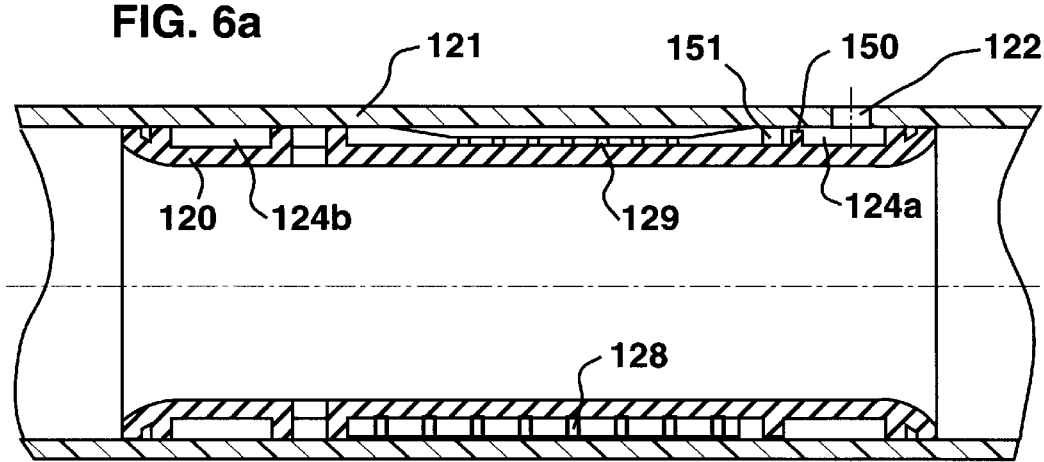
FIG. 6a is a sectional view along line 6a of FIG. 6.

FIGS. 6, 6a and 6b illustrate one construction in which the invention may be incorporated in a one-piece emitter unit of elastomeric material, as described for example in the above-cited U.S. Pat. Nos. 5,400,973 and 5,609,303.

The emitter unit illustrated in FIG. 6a, therein designated 120, is a one-piece unit completely made of elastomeric material. It is received within the water supply tube 121 formed with a plurality of water discharge opening 122 along its length, each emitter unit including an outlet channel 124a aligned with one of the water discharge openings. The outer face of the emitter unit 120 is formed with one set of baffles 128 which, in cooperation with the inner face of the water supply tube, define the non-regulating or flow-reducing labyrinth; whereas the outer face of the opposite side of the emitter unit is formed with the second set of baffles 129 which define, with the inner face of the water supply tube, the flow-regulating labyrinth.

In this case, the outer face of the emitter 120 is formed with a rib 150 extending across the outlet 151 from the flow-regulating labyrinth 129. Rib 150 is spaced slightly downstream of the opening 151 so that normally it does not fully obstruct the opening. However, since rib 150 is made of elastomeric material, it will be deflected away from the opening in the forward flow of the water, from labyrinth 129 to the water discharge opening 122, to permit relatively-unobstructed flow in that direction, but it will be deflected towards the opening 151, during reverse flow from the water discharge opening 122 towards the labyrinth 129, thereby blocking the entry into the labyrinth of any foreign particles that may pass through the water discharge opening.

Figure 7:
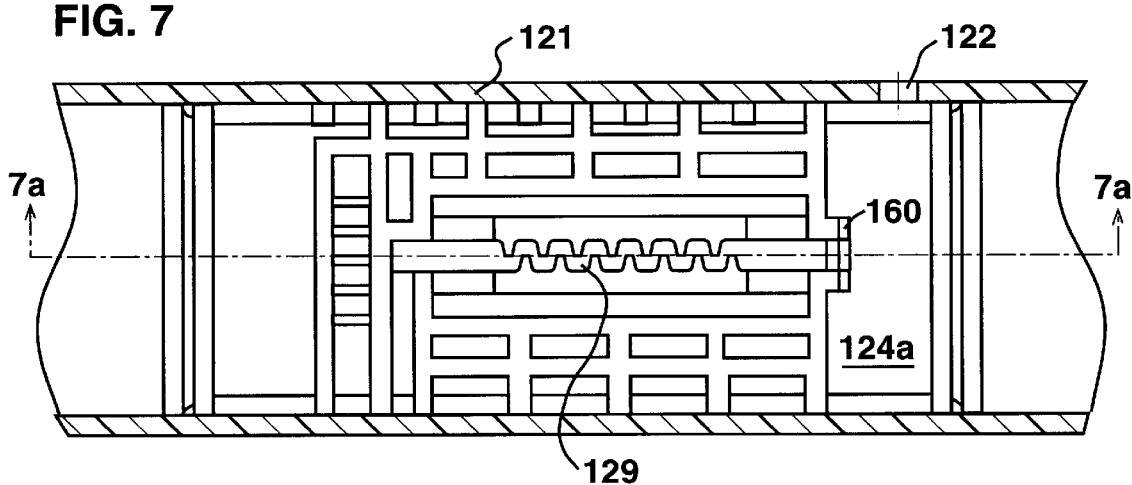
FIG. 7 is a view similar to that of FIG. 6 but illustrating another manner of modifying the emitter to incorporate the present invention.
Figure 7A:
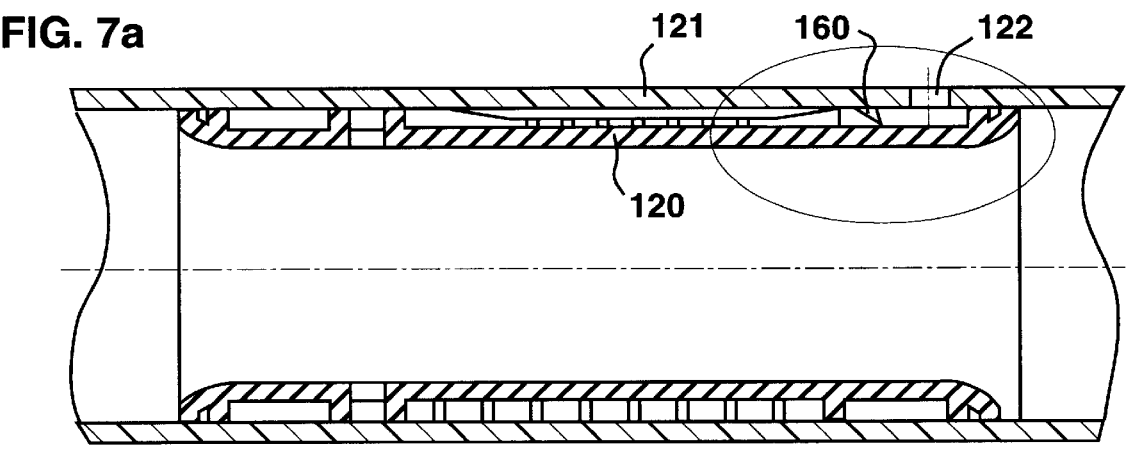
FIG. 7a is a sectional view along line 7a of FIG. 7.
Figure 7B:
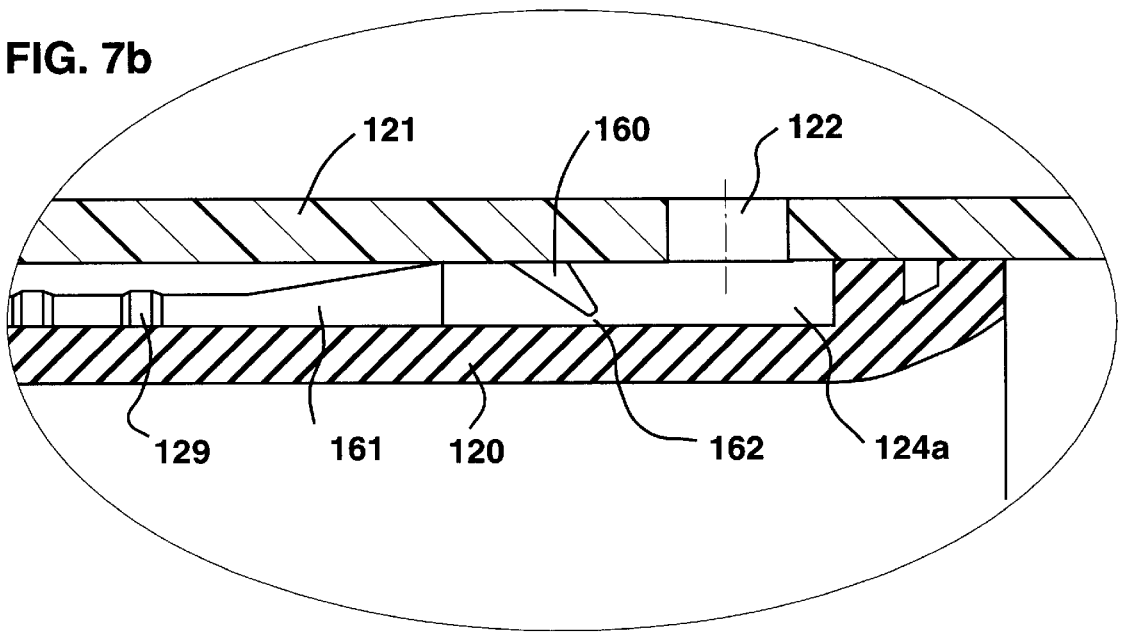

FIGS. 7, 7a and 7b illustrate another construction that may be used wherein, instead of rib 150, there is provided a flap 160 across the outlet recess 161. Flap 160 normally defines a clearance 162 which is enlarged during the forward flow of the water from recess 161 to the water discharge opening 122. Flap 160, however, is pivoted in the opposite direction to block the clearance in case of reverse flow of the water in the direction from water discharge opening 122 to recess 161.

While the invention has been described with respect to several preferred embodiments, it will be appreciated that these are set forth merely for purposes of example, and that the invention could be used in many other types of drippers, both of the pressure-compensated or regulated type and of the non-regulated type. The invention could also be used with emitters of partial cylindrical configuration, i.e., of less than one-half a cylinder, as well as the illustrated cylindrical construction. Many other variations, modifications and applications of the invention will be apparent.

I claim:

1. A drip irrigation emitter defining a flow control passageway having an inlet to communicate with a supply of pressurized water, and an outlet to communicate with a water discharge opening; characterized in that said emitter further includes an obstruction formation between said outlet of the flow control passageway and the water discharge opening effective to produce a relatively small obstruction to the flow in the direction from said outlet of the flow control passageway to said water discharge opening, and a relatively large obstruction to the flow in the reverse direction such as to reduce the possibility of the entry of external solid particles into the emitter via said water discharge opening.

2. The emitter according to claim 1, wherein said obstruction formation includes a tooth formed with one face facing the outlet of the flow control passageway and having a relatively small angle to the emitter surface at said outlet such as to produce a relatively small obstruction to the flow in the direction from said outlet to said water discharge opening, and an opposite face facing the water discharge opening and having a relatively large angle to the emitter surface such as to produce a relatively large obstruction to the flow in the reverse direction.

3. The emitter according to claim 2, wherein said tooth is deformable towards the water discharge opening such as to produce a relatively small obstruction to the flow in the first-mentioned direction, and a relatively large obstruction to the flow in said reverse direction.

4. The emitter according to claim 2, wherein said obstruction formation includes a plurality of said teeth between said outlet of the flow control passageway and said water discharge opening arranged in a series on the one side of said outlet.

5. The emitter according to claim 2, wherein said obstruction formation includes a pair of said teeth between said outlet of the flow control passageway and said water discharge opening arranged on opposite sides of said outlet.

6. The emitter according to claim 5, wherein said obstruction formation includes a plurality of said pairs of teeth.

7. The emitter according to claim 1, wherein said obstruction formation includes a one-way valve between said flow control passageway outlet and water discharge opening, and effective to permit free flow in the first-mentioned direction, but to block flow in said reverse direction.

8. The emitter according to claim 7, wherein the emitter is of elastomeric material, and said one-way valve is also of elastomeric material integrally formed with said emitter.

9. The emitter according to claim 8, wherein said one-way valve is in the form of a rib deformable towards and away from said outlet.

10. The emitter according to claim 8, wherein said one-way valve is in the form of a flap deformable towards and away from said outlet.

11. A drip irrigation emitter, comprising:
a water supply tube for conducting water therethrough and having a plurality of water discharge openings spaced along its length;
and a plurality of emitter units secured within the water supply tube such that each emitter unit defines with the tube a flow control passageway having an inlet communicating with the interior of the water supply tube and an outlet communicating with a water discharge opening in the water supply tube;
each of said emitter units including an obstruction formation between said outlet of the flow control passageway and the water discharge opening effective to produce a relatively small obstruction to the flow in the direction from said outlet of the flow control passageway to said water discharge opening, and a relatively large obstruction to the flow in the reverse direction such as to reduce the possibility of the entry of external solid particles into the emitter via said water discharge opening.

12. The emitter according to claim 11, wherein in each emitter unit, said obstruction formation includes a tooth formed with one face facing the outlet of the flow control passageway and having a relatively small angle to the emitter surface at said outlet such as to produce a relatively small obstruction to the flow in the direction from said outlet to said water discharge opening, and an opposite face facing the water discharge opening and having a relatively large angle to the emitter surface such as to produce a relatively large obstruction to the flow in the reverse direction.

13. The emitter according to claim 12, wherein said tooth is deformable towards the water discharge opening such as to produce a relatively small obstruction to the flow in the first-mentioned direction, and a relatively large obstruction to the flow in said reverse direction.

14. The emitter according to claim 11, wherein each of said emitter units is of cylindrical configuration and is formed with an annular outlet channel communicating with said outlet of the flow control passageway aligned with a water discharge opening in the tube, said tooth being of annular configuration located between said outlet of the flow control passageway and said annular outlet channel.

15. The emitter according to claim 12, wherein in each emitter unit, said obstruction formation includes a plurality of said teeth between said outlet of the flow control passageway and said water discharge opening arranged in a series on one side of said outlet.

16. The emitter according to claim 12, wherein in each emitter unit, said obstruction formation includes a pair of said teeth between said outlet of the flow control passageway and said water discharge opening arranged on opposite sides of said outlet.

17. The emitter according to claim 16, wherein in each emitter unit, said obstruction formation includes a plurality of said pairs of teeth.

18. The emitter according to claim 11, wherein in each emitter unit, said obstruction formation includes a one-way valve between said outlet of the flow control passageway and water discharge opening, and effective to permit free flow in said first-mentioned direction, but to block flow in said reverse direction.

19. The emitter according to claim 11, wherein each of said emitter units is of cylindrical configuration.

20. The emitter according to claim 11, wherein said flow control passageway in each emitter unit includes a flow-reducing labyrinth at the upstream end of the emitter unit, and a flow-regulating labyrinth at the downstream end of the emitter unit, said obstruction formation being downstream of said flow-regulating labyrinth.

* * * * *